(12) United States Patent
Collings

(10) Patent No.: US 7,178,362 B2
(45) Date of Patent: Feb. 20, 2007

(54) EXPANSION DEVICE ARRANGEMENT FOR VAPOR COMPRESSION SYSTEM

(75) Inventor: Douglas A. Collings, Tecumseh, MI (US)

(73) Assignee: Tecumseh Products Cormpany, Tecumseh, MI (US)

( * ) Notice: Subject to any disclaimer, the term of this patent is extended or adjusted under 35 U.S.C. 154(b) by 192 days.

(21) Appl. No.: 11/041,856

(22) Filed: Jan. 24, 2005

(65) Prior Publication Data

US 2006/0162377 A1   Jul. 27, 2006

(51) Int. Cl.
   *F25B 41/06*   (2006.01)
(52) U.S. Cl. ...................................... 62/527
(58) Field of Classification Search ........... 62/205, 62/222, 511, 527, 528; 137/493.8, 493.9, 137/625.4; 138/45, 46
   See application file for complete search history.

(56) References Cited

U.S. PATENT DOCUMENTS

| | | | | |
|---|---|---|---|---|
| 3,150,502 A * | 9/1964 | Tucker | .................. | 62/197 |
| 3,285,030 A * | 11/1966 | Coyne | .................. | 62/197 |
| 3,677,028 A * | 7/1972 | Raymond | .................. | 62/200 |
| 4,510,767 A * | 4/1985 | Komatsu et al. | .................. | 62/200 |
| 5,195,331 A * | 3/1993 | Zimmern et al. | .................. | 62/202 |
| 5,209,073 A | 5/1993 | Thomas et al. | .................. | 62/81 |
| 5,782,102 A * | 7/1998 | Iritani et al. | .................. | 62/197 |
| 5,860,287 A * | 1/1999 | O'Neal | .................. | 62/201 |
| 5,894,741 A | 4/1999 | Durham et al. | .................. | 62/525 |
| 6,092,379 A | 7/2000 | Nishida et al. | .................. | 62/200 |
| 6,105,386 A | 8/2000 | Kuroda et al. | .................. | 62/513 |
| 6,178,761 B1 | 1/2001 | Karl | .................. | 62/159 |
| 6,289,924 B1 * | 9/2001 | Kozinski | .................. | 137/504 |
| 6,305,414 B1 * | 10/2001 | Kozinski | .................. | 137/504 |
| 6,327,868 B1 | 12/2001 | Furuya et al. | .................. | 62/197 |
| 6,381,974 B1 * | 5/2002 | Hwang et al. | .................. | 62/199 |
| 6,397,616 B2 | 6/2002 | Yamasaki et al. | .................. | 62/244 |
| 6,430,950 B1 | 8/2002 | Dienhart et al. | .................. | 62/222 |
| 6,502,413 B2 | 1/2003 | Repice et al. | .................. | 62/225 |
| 6,588,223 B2 | 7/2003 | Dienhart et al. | .................. | 62/228.3 |
| 6,883,344 B2 * | 4/2005 | Gu | .................. | 62/324.1 |
| 2002/0184912 A1 | 12/2002 | Tso et al. | .................. | 62/511 |
| 2003/0010834 A1 | 1/2003 | Yano et al. | .................. | 236/92 B |

FOREIGN PATENT DOCUMENTS

| | | | |
|---|---|---|---|
| JP | 10-19401 | | 1/1998 |
| JP | 10-220888 A | * | 8/1998 |

(Continued)

*Primary Examiner*—Mohammad M. Ali
(74) *Attorney, Agent, or Firm*—Baker & Daniels LLP

(57) ABSTRACT

A carbon dioxide vapor compression system including a compressor, a first heat exchanger, an expansion device arrangement, and a second heat exchanger connected in a closed loop. The expansion device arrangement includes an inlet line disposed between the first heat exchanger and the expansion devices and an outlet line disposed between the expansion devices and the second heat exchanger. The expansion device arrangement includes at least three expansion devices with a fixed and variable expansion device being in parallel arrangement and another fixed expansion device being arranged in series with the parallel fixed and variable expansion devices. The expansion device arrangement may also include a flow path that extends from the inlet line to the outlet line and which includes only fixed expansion devices to provide a functional flow path through the expansion device arrangement if the variable expansion device fails.

18 Claims, 1 Drawing Sheet

FOREIGN PATENT DOCUMENTS

| | | |
|---|---|---|
| JP | 11-142024 | 5/1999 |
| JP | 2000-266415 | 9/2000 |
| JP | 2001-272121 | 10/2001 |
| JP | 2001-296067 | 10/2001 |
| JP | 2002-22298 | 1/2002 |
| JP | 2002-130856 | 5/2002 |

* cited by examiner

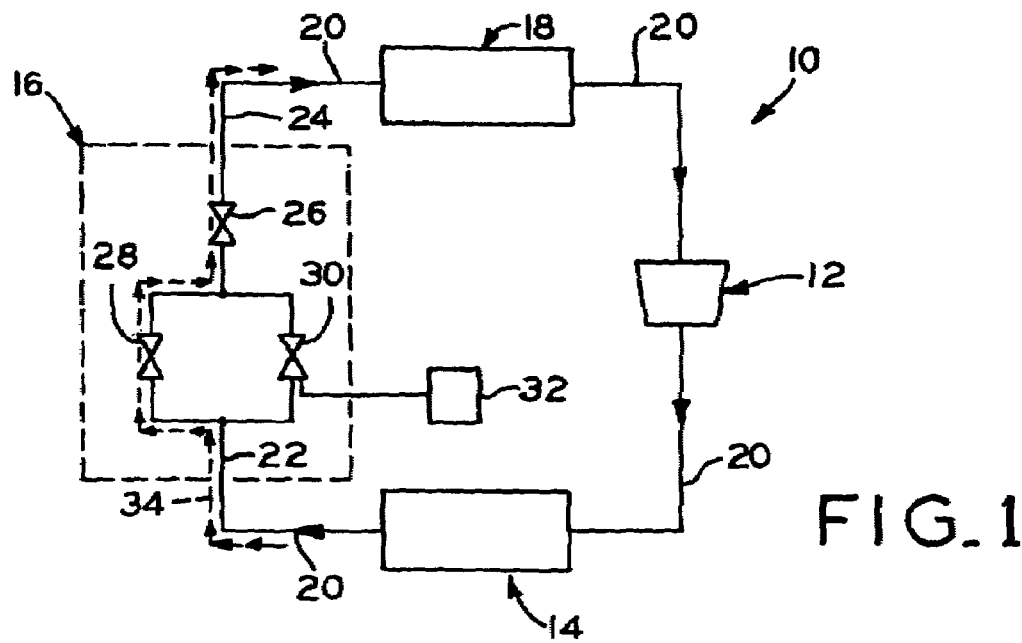
FIG._1
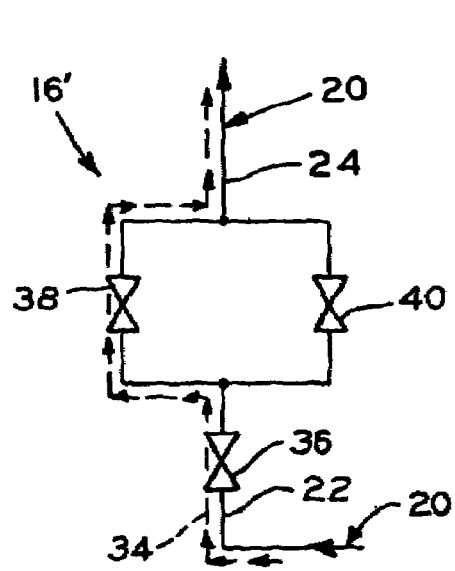
FIG._2
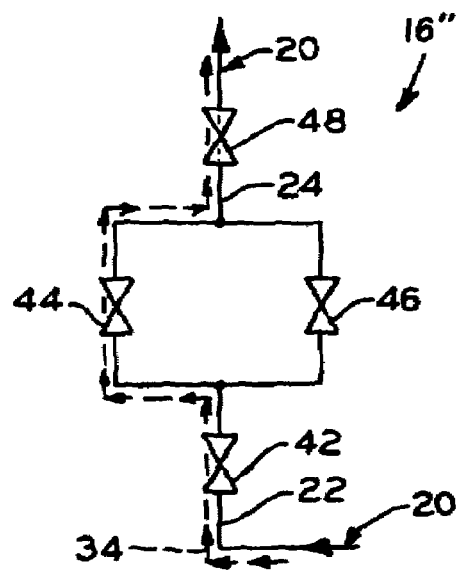
FIG._3

EXPANSION DEVICE ARRANGEMENT FOR VAPOR COMPRESSION SYSTEM

BACKGROUND OF THE INVENTION

1. Field of the Invention

The present invention relates to a vapor compression system and more particularly to the use of a plurality of fixed and variable type expansion devices in the vapor compression system.

2. Description of the Related Art

A vapor compression system typically includes a compressor, a first heat exchanger, an expansion device, and a second heat exchanger fluidly connected in series. Other components such as accumulators or economizing heat exchangers are also well-known and may be employed with the vapor compression system but are not essential for the operation of the vapor compression system. In operation, the compressor typically compresses a refrigerant vapor from a low suction pressure to a higher discharge pressure. The refrigerant is cooled in the first heat exchanger. In a subcritical vapor compression system, the refrigerant is converted from a gas state to a liquid state in the first heat exchanger which may be referred to as a condenser. The high pressure liquid refrigerant exiting the condenser passes through the expansion device where the pressure of the liquid is reduced. The low pressure liquid refrigerant is then converted to a vapor in the second heat exchanger, commonly referred to as an evaporator. The conversion of the refrigerant to a vapor requires thermal energy and the evaporator may be used to cool a secondary heat medium, e.g., air that may then be used to cool a refrigerated cabinet or the interior space of a building. The low pressure refrigerant vapor is then returned to the compressor and the cycle is repeated. Other applications, such as heat pump and water heater applications may utilize a vapor compression system for the heat generated by the first heat exchanger.

Other known types of vapor compression systems include transcritical vapor compression systems. In such transcritical systems, the refrigerant is compressed to a supercritical pressure by the compressor and is returned to the compressor at a subcritical pressure. When the refrigerant is at a supercritical pressure, the liquid and vapor phases of the refrigerant are indistinguishable and the first heat exchanger is commonly referred to as a gas cooler. After cooling the refrigerant in the gas cooler, the pressure of the refrigerant is reduced to a subcritical pressure by the expansion device and the low pressure liquid is communicated to the evaporator where the refrigerant is converted back to a vapor.

When carbon dioxide is used as a refrigerant, the vapor compression system must typically be operated as a transcritical system. The use of carbon dioxide as a refrigerant also generally requires the use of a discharge pressure that is considerably higher than the discharge pressure used with conventional refrigerants that can be used in a subcritical system. This relatively high pressure required when using carbon dioxide as refrigerant may result in greater stress and wear on the individual components which form the vapor compression system. For example, when a variable expansion valve is employed as the expansion device in a transcritical vapor compression system employing carbon dioxide as a refrigerant, the valve seat of the expansion valve may be subject to a relatively high rate of wear and negatively impact the length of its useful life.

SUMMARY OF THE INVENTION

The present invention provides a vapor compression system that includes a compressor, a first heat exchanger, an expansion device arrangement, and a second heat exchanger. The expansion device arrangement includes a plurality of expansion devices including at least two fixed expansion devices and one variable expansion device which are arranged in a configuration whereby the wear on the variable expansion device is reduced.

The invention comprises, in one form thereof, a vapor compression system including a fluid circuit circulating a refrigerant charge in a closed loop. The fluid circuit has operably disposed therein, in serial order, a compressor, a first heat exchanger, an expansion device arrangement, and a second heat exchanger. The expansion device arrangement includes an inlet line, an outlet line, and a plurality of expansion devices. The inlet line is disposed in the fluid circuit between the plurality of expansion devices and the first heat exchanger and conveys the entirety of the refrigerant charge at a relatively high first pressure. The outlet line is disposed in the fluid circuit between the plurality of expansion devices and the second heat exchanger and conveys the entirety of the refrigerant charge at a relatively low second pressure. The plurality of expansion devices includes first, second and third expansion devices with the first and second expansion devices including fixed expansion devices and the third expansion device including a variable expansion device. The second and third expansion devices are arranged in parallel and the first expansion device is arranged in series with the second and third expansion valves wherein the pressure drop across the third expansion device is less than the difference between the relatively high first pressure and the relatively low second pressure and less than the entire refrigerant charge is circulated through the third expansion device.

The invention comprises, in another form thereof, a vapor compression system having a fluid circuit circulating a carbon dioxide refrigerant charge in a closed loop. The fluid circuit has operably disposed therein, in serial order, a compressor, a first heat exchanger, an expansion device arrangement, and a second heat exchanger. The expansion device arrangement includes an inlet line, an outlet line, and a plurality of expansion devices. The inlet line is disposed in the fluid circuit between the plurality of expansion devices and the first heat exchanger and conveys the entirety of the refrigerant charge at a supercritical first pressure. The outlet line is disposed in the fluid circuit between the plurality of expansion devices and the second heat exchanger and conveys the entirety of the refrigerant charge at a subcritical second pressure. The plurality of expansion devices includes first, second and third expansion devices with the first and second expansion devices being fixed expansion devices and the third expansion device being a variable expansion device. The second and third expansion devices are arranged in parallel and the first expansion device is arranged in series with the second and third expansion devices wherein a pressure drop across the third expansion device is less than the difference between the supercritical first pressure and the subcritical second pressure and less than the entire refrigerant charge is circulated through the third expansion device. The plurality of expansion devices are arranged to define at least one flow path between the inlet line and the outlet line wherein each expansion device disposed within the flow path is a fixed expansion device.

The invention comprises, in a further form thereof, a method of operating a vapor compression system. The method includes providing a fluid circuit circulating a refrigerant charge in a closed loop, the fluid circuit having operably disposed therein, in serial order, a compressor, a first heat exchanger, an expansion device arrangement including a plurality of expansion devices and a second heat exchanger. The method also includes compressing the refrigerant in the compressor, removing thermal energy from the refrigerant in the first heat exchanger; reducing the pressure of the refrigerant in the expansion device arrangement from a relatively high first pressure to a relatively low second pressure, and adding thermal energy to the refrigerant in the second heat exchanger. Reducing the pressure of the refrigerant in the expansion device arrangement includes passing the entire refrigerant charge circulated through the fluid circuit through the expansion device arrangement, subdividing the refrigerant charge into a first portion and a second portion, using a variable expansion device to variably reduce the pressure of the first portion of the refrigerant and using at least one fixed expansion device to reduce the pressure of the second portion of the refrigerant wherein the variable expansion device reduces the pressure of the refrigerant by an amount that is less than the pressure difference between the relatively high first pressure and the relatively low second pressure and recombining the first and second portions of the refrigerant charge at a location between the plurality of expansion devices and the second heat exchanger.

An advantage of the present invention is that the pressure drop across the variable expansion device in the expansion device arrangement is less than the maximum pressure drop between the relatively high gas pressure on the incoming side of the expansion device arrangement and the relatively low gas pressure on the outgoing side of the expansion device arrangement, thus improving the device life.

Another advantage is of the present invention is that less than the entire refrigerant charge passes through the variable expansion device, also improving the life of the device.

Yet another advantage of the present invention is that if the variable expansion device would fail, a refrigerant flow path still exists through the expansion device arrangement to permit refrigerant flow to be maintained between the first and second heat exchangers and thus through the refrigeration system.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein:

FIG. 1 is a schematic view of a vapor compression system in accordance with the present invention.

FIG. 2 is a schematic view of a second embodiment of the expansion device arrangement of the present invention.

FIG. 3 is a schematic view of a third embodiment of the expansion device arrangement of the present invention.

Corresponding reference characters indicate corresponding parts throughout the several views. Although the exemplification set out herein illustrates the invention, the embodiments disclosed below are not intended to be exhaustive or to be construed as limiting the scope of the invention to the precise forms disclosed.

DESCRIPTION OF THE PRESENT INVENTION

Referring to FIG. 1, vapor compression system 10 is a closed loop fluid circuit having operably disposed therein, in serial order, compressor 12, first heat exchanger 14, expansion device arrangement 16, and second heat exchanger 18. The components of system 10 are fluidly connected by a plurality of conduits 20. In the illustrated embodiment, a charge of carbon dioxide flows through the fluid circuit, however, other refrigerants may alternatively be employed with the present invention.

The use of carbon dioxide as the refrigerant requires system 10 to operate as a transcritical vapor compression system and at pressures substantially greater than a vapor compression system using a conventional refrigerant in a subcritical system. During operation of system 10, carbon dioxide is conveyed to compressor 12 from second heat exchanger 18 at a low or suction pressure. The compression of the carbon dioxide increases its temperature and pressure to a higher discharge temperature and pressure. When employing carbon dioxide as the refrigerant, this discharge pressure will be a supercritical pressure. The discharged refrigerant is then conveyed to first heat exchanger 14. In heat exchanger 14, the refrigerant is cooled. The high pressure refrigerant exhausted from heat exchanger 14 is then conveyed to expansion device arrangement 16 where the pressure of the refrigerant is reduced. The relatively low pressure refrigerant is then conveyed to second heat exchanger 18. When employing carbon dioxide as the refrigerant, the carbon dioxide will be reduced to a subcritical pressure by the expansion device arrangement 16. Thermal energy is transferred to the low pressure, liquid refrigerant within heat exchanger 18 which is thereby converted to a vapor or gas state. The low pressure refrigerant vapor is then returned to compressor 12 and the cycle is repeated.

Such a vapor compression system may be used in various applications that are well known in the art. For example, heat exchanger 14 can be used to heat a secondary heat exchange medium such as air, in a heat pump application, or water, in a water heater application. In other applications, heat exchanger 18 may be used to cool a secondary heat exchange medium, such as air, in air conditioning or refrigerated cabinet applications.

Referring to FIG. 1, a first embodiment of expansion device arrangement 16 is shown. Expansion device arrangement 16 includes inlet line 22, outlet line 24, and expansion devices 26, 28, and 30. Inlet line 22 is located between heat exchanger or gas cooler 14 and the plurality of expansion devices 26, 28, and 30 and outlet line 24 is located between the plurality of expansion devices 26, 28, and 30 and second heat exchanger or evaporator 18. The expansion device arrangement 16 illustrated in FIG. 1 includes three expansion devices with first expansion device 26 being positioned serially with second and third expansion devices 28 and 30 that are arranged in parallel. Third expansion device 30 is a variable expansion device while the other two expansion devices 26 and 28 are fixed expansion devices. Fixed expansion devices 26 and 28 can be a conventional fixed orifice expansion plate, capillary tube or other form of fixed expansion device known to those having ordinary skill in the art. Both expansion devices 26 and 28 may be of the same type or a combination of different types of fixed expansion devices. Variable expansion devices are also well known to those having ordinary skill in the art and, in the illustrated embodiment, expansion device 30 is an electronically controlled variable expansion valve.

The operation of variable expansion device 30 is governed by controller 32 as schematically illustrated in FIG. 1. By adjustment of variable expansion device 30, the total pressure drop across expansion device arrangement 16 can be varied to respond to changes in the operating conditions of system 10. For example, controller 32 may receive data from temperature and pressure sensors arranged at different locations on system 10 and then adjust variable expansion device 30 to adjust the reduction of pressure across device 30 in response to varied loads placed on system 10 or other changes in the operating parameters as is known to those having ordinary skill in the art. While only a portion of the total refrigerant charge flows through device 30, this portion of the refrigerant charge is recombined with the remainder of the refrigerant flow and by controlling the pressure drop across device 30 the pressure drop for the total refrigerant charge across arrangement 16, i.e., the difference in pressure of the refrigerant in inlet 22 and outlet 24, may also be controlled. While the illustrated variable expansion device 30 is an electronically controlled variable expansion valve controlled by controller 32, other forms of variable expansion devices known to those having ordinary skill in the art may also be employed with the present invention.

In the embodiment of FIG. 1, the refrigerant flow in inlet line 22 is subdivided into two portions which then separately pass through second and third expansion devices 28 and 30 which are positioned in parallel to one another. The refrigerant flow is then recombined before entering first fixed expansion device 26 which located in series with the second and third expansion devices 28 and 30. After passing through fixed expansion device 26, the refrigerant exits expansion device arrangement 16 via outlet line 24 and is conveyed to heat exchanger 18.

As discussed above, when using carbon dioxide as the refrigerant, the carbon dioxide flowing through inlet line 22 will be at a relatively high, supercritical pressure. After passing through expansion device arrangement 16, the pressure of the carbon dioxide in outlet line 24 will be a lower-subcritical pressure. Expansion devices 26, 28, and 30 within arrangement 16 are configured in a manner to minimize the wear on variable expansion device 30. By arranging fixed expansion device 26 in series with expansion devices 28 and 30, the pressure drop across variable expansion device 30 is less than the total pressure drop of expansion device arrangement 16 thereby reducing the stress placed on expansion device 30 and allowing a smaller device to be used. Due to the parallel arrangement of fixed expansion device 28 and variable expansion device 30, the refrigerant charge flowing through arrangement 16 is divided into two portions with a first portion passing through fixed expansion device 28 and a second portion passing through variable expansion device 30. With this parallel arrangement, less than the entire refrigerant charge being actively circulated within the system passes through variable expansion device 30 thereby reducing the wear on variable expansion device 30.

In comparison to variable expansion devices, fixed expansion devices are generally more rugged, reliable and less expensive. By limiting the pressure drop and volume of refrigerant flow through variable expansion device 30 by the use of parallel and serially arranged fixed expansion devices, the stress and wear on variable expansion device can reduced and the useful life of the variable expansion device 30 prolonged. In many vapor compression systems, either a single fixed expansion device or a single variable expansion device is employed to reduce the pressure of the refrigerant. The use of a fixed expansion device generally provides a longer lasting, less expensive alternative than a variable expansion device but does not provide for the variable adjustment of the pressure drop generated by the expansion device. The use of a single variable expansion device to provide the sole means of reducing the pressure of the refrigerant in a system, while providing for the variable adjustment of the pressure drop, would require a larger expansion device than one which did not experience the full pressure drop of the system or which had only a portion of the refrigerant charge pass therethrough. Consequently, arrangement 16 allows for the use of a smaller, and thus less expensive, variable expansion device to provide for the variable adjustment of the pressure drop generated by arrangement 16 and, by reducing the stress and wear on the variable expansion device, helps to prolong the useful life of the variable expansion device.

Furthermore, expansion device arrangement 16 defines a flow path 34 that extends from inlet line 22 to outlet line 24 that passes through only fixed expansion devices, i.e., fixed expansion device 28, and fixed expansion 26. When variable expansion devices fail, they may substantially or entirely close and either severely limit or entirely prohibit the passage of refrigerant therethrough. When this type of failure occurs, the pressure in the high pressure side of the system will continue to increase until the system is either shutdown or the refrigerant is vented from the high pressure side of the system. This increased pressure can cause damage to system components or cause a leak in the system. Although pressure relief valves and automated shutdown of systems by a controller are known in the art, damage to the system and/or leaks may still occur prior to the venting of the excessively high pressure refrigerant or shutdown of the system. For systems operating at relatively high pressures, such as transcritical carbon dioxide systems, this can be a particularly relevant concern. By providing a flow path 34 through expansion device arrangement 16 that passes through only fixed expansion devices, i.e., devices 26 and 28, arrangement 16 allows refrigerant to continue to be circulated through the system, with the pressure of the refrigerant still being reduced in arrangement 16, even if variable expansion device 30 fails in a manner that blocks or significantly inhibits the flow of refrigerant therethrough.

Referring to FIG. 2, an alternative embodiment of the expansion device arrangement is illustrated. Expansion device arrangement 16' includes a fixed expansion device 36 located upstream of expansion devices 38, 40. After passing through fixed expansion device 36, the refrigerant is divided into two portions with a first portion flowing through fixed expansion device 38 and a second portion flowing through variable expansion device 40. Fixed and variable expansion devices 38 and 40 are arranged in parallel. After passing through expansion devices 38, 40, the low pressure refrigerant is recombined and flows through outlet line 24 to heat exchanger 18. Arrangement 16' also defines a flow path 34 therethrough which includes only fixed expansion devices. As shown, flow path 34 extends through inlet line 22, fixed expansion device 36, fixed expansion device 38, and outlet line 24.

Referring to FIG. 3, a third embodiment of the expansion device arrangement is illustrated. In this embodiment, expansion device arrangement 16" includes four expansion devices including two arranged in parallel and two arranged serially with the parallel devices. Inlet line 22 leads to fixed expansion device 42 through which the refrigerant flows before being divided into first and second portions that respectively pass through fixed expansion device 44 and variable expansion device 46. The refrigerant exiting expansion devices 44 and 46 and is recombined before flowing through fixed expansion device 48. After passing through fixed expansion device 48, the refrigerant enters outlet line 24 and is then conveyed to heat exchanger 18. Arrangement 16" also defines a flow path 34 extending through arrangement 16" that includes only fixed expansion devices. As shown, flow path extends from inlet line 22, through fixed expansion device 42, fixed expansion device 44, and fixed expansion device 48 to outlet line 24.

While this invention has been described as having an exemplary design, the present invention may be further modified within the spirit and scope of this disclosure. This application is therefore intended to cover any variations, uses, or adaptations of the invention using its general principles.

What is claimed is:

1. A vapor compression system comprising:
a fluid circuit circulating a refrigerant charge in a closed loop, said fluid circuit having operably disposed therein, in serial order, a compressor, a first heat exchanger, an expansion device arrangement, and a second heat exchanger;
said expansion device arrangement including an inlet line, an outlet line, and a plurality of expansion devices, said inlet line disposed in said fluid circuit between said plurality of expansion devices and said first heat exchanger and conveying the entirety of the refrigerant charge at a relatively high first pressure, said outlet line disposed in said fluid circuit between said plurality of expansion devices and said second heat exchanger and conveying the entirety of the refrigerant charge at a relatively low second pressure; and
wherein said plurality of expansion devices includes first, second and third expansion devices, said first and second expansion devices comprising fixed expansion devices and said third expansion device comprising a variable expansion valve, said second and third expansion devices being arranged in parallel and said first expansion device being arranged in series with said second and third expansion devices wherein a pressure drop across said third expansion device is less than the difference between the relatively high first pressure and the relatively low second pressure and wherein less than the entire refrigerant charge is circulated through said third expansion device.

2. The vapor compression system of claim 1 wherein at least one of said first and second expansion devices is a fixed orifice expansion device.

3. The vapor compression system of claim 1 wherein at least one of said first and second expansion devices is a capillary tube.

4. The vapor compression system of claim 1 wherein said third expansion device is an electronically controlled variable expansion device.

5. The vapor compression system of claim 1 wherein said refrigerant charge comprises carbon dioxide and said relatively high first pressure is a supercritical pressure and said relatively low second pressure is a subcritical pressure.

6. The vapor compression system of claim 1 wherein said first expansion device is operably disposed between said inlet line and said second and third expansion devices.

7. The vapor compression system of claim 6 further comprising a fourth expansion device, said fourth expansion device comprising a fixed expansion device operably disposed between said second and third expansion devices and said outlet line.

8. The vapor compression system of claim 1 wherein said plurality of expansion devices are arranged to define at least one flow path between said inlet line and said outlet line wherein each expansion device disposed within said flow path is a fixed expansion device.

9. The vapor compression system of claim 8 wherein each of said fixed expansion devices in said at least one flow path are fixed orifice expansion devices.

10. A vapor compression system comprising:
a fluid circuit circulating a carbon dioxide refrigerant charge in a closed loop, said fluid circuit having operably disposed therein, in serial order, a compressor, a first heat exchanger, an expansion device arrangement, and a second heat exchanger;
said expansion device arrangement including an inlet line, an outlet line, and a plurality of expansion devices, said inlet line disposed in said fluid circuit between said plurality of expansion devices and said first heat exchanger and conveying the entirety of the refrigerant charge at a supercritical first pressure, said outlet line disposed in said fluid circuit between said plurality of expansion devices and said second heat exchanger and conveying the entirety of the refrigerant charge at a subcritical second pressure; and
wherein said plurality of expansion devices includes first, second and third expansion devices, said first and second expansion devices comprising fixed expansion devices and said third expansion device comprising a variable expansion valve, said second and third expansion devices being arranged in parallel and said first expansion device being arranged in series with said second and third expansion valves wherein a pressure drop across said third expansion device is less than the difference between the supercritical first pressure and the subcritical second pressure and less than the entire refrigerant charge is circulated through said third expansion valve, and said plurality of expansion devices are arranged to define at least one flow path between said inlet line and said outlet line wherein each expansion device disposed within said flow path is a fixed expansion device.

11. The vapor compression system of claim 10 wherein at least one of said first and second expansion devices is a fixed orifice expansion device.

12. The vapor compression system of claim 10 wherein at least one of said first and second expansion devices is a capillary tube.

13. The vapor compression system of claim 10 wherein said third expansion device is an electronically controlled variable expansion device.

14. The vapor compression system of claim 10 wherein said first expansion device is operably disposed between said inlet line and said second and third expansion devices.

15. The vapor compression system of claim 14 further comprising a fourth expansion device, said fourth expansion device comprising a fixed expansion device operably disposed between said second and third expansion devices and said outlet line.

16. A method of operating a vapor compression system, said method comprising:
providing a fluid circuit circulating a refrigerant charge in a closed loop, the fluid circuit having operably disposed therein, in serial order, a compressor, a first heat exchanger, an expansion device arrangement including a plurality of expansion devices and a second heat exchanger;
compressing the refrigerant in the compressor;

removing thermal energy from the refrigerant in the first heat exchanger;

reducing the pressure of the refrigerant in the expansion device arrangement from a relatively high first pressure to a relatively low second pressure;

adding thermal energy to the refrigerant in the second heat exchanger; and wherein reducing the pressure of the refrigerant in the expansion device arrangement comprises passing the entire refrigerant charge circulated through the fluid circuit through the expansion device arrangement, subdividing the refrigerant charge into a first portion and a second portion, using a variable expansion device to variably reduce the pressure of the first portion of the refrigerant and using at least one fixed expansion device to reduce the pressure of the second portion of the refrigerant wherein the variable expansion device reduces the pressure of the refrigerant by an amount that is less than the pressure difference between the relatively high first pressure and the relatively low second pressure and recombining the first and second portions of the refrigerant charge at a location between the plurality of expansion devices and the second heat exchanger.

17. The method of claim 16 wherein reducing the pressure of the refrigerant in the expansion device arrangement includes passing the entire refrigerant charge through a fixed expansion device that is arranged serially with the variable expansion device and the at least one fixed expansion device.

18. The method of claim 17 wherein the expansion device arrangement defines at least one flow path allowing communication of refrigerant from the first heat exchanger to the second heat exchanger wherein each of the expansion devices disposed in the at least one flow path is a fixed expansion device.

\* \* \* \* \*